(No Model.)
J. H. BARRETT.
HORSE DETACHER.
No. 265,000. Patented Sept. 26, 1882.
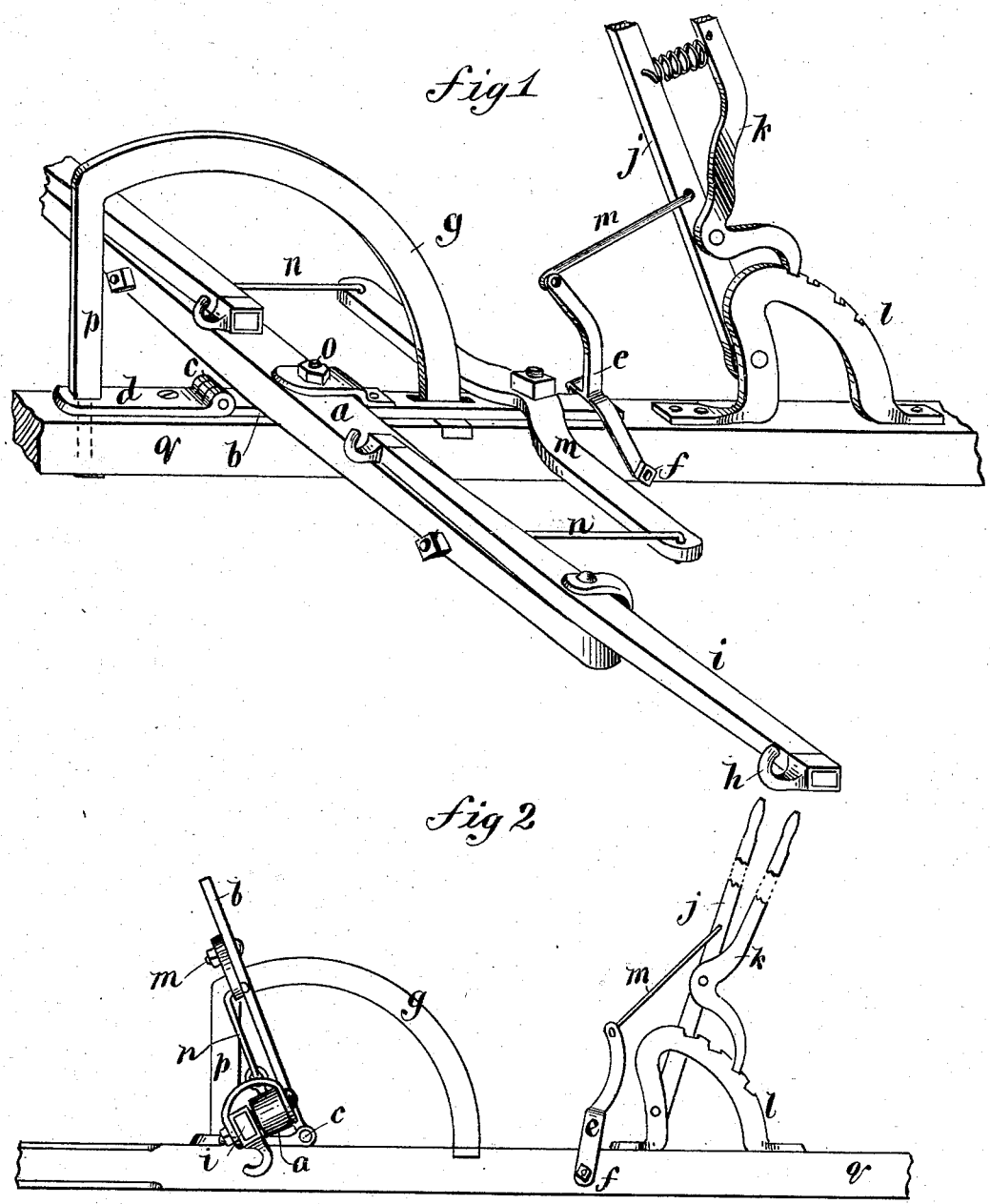
WITNESSES:
INVENTOR:
J. H. Barrett
BY Munn & Co.
ATTORNEYS.

UNITED STATES PATENT OFFICE.

JAMES H. BARRETT, OF EL DORADO, ILLINOIS, ASSIGNOR TO HIMSELF AND JAMES SHAVER, OF SAME PLACE.

HORSE-DETACHER.

SPECIFICATION forming part of Letters Patent No. 265,000, dated September 26, 1882.

Application filed July 18, 1882. (No model.)

*To all whom it may concern:*

Be it known that I, JAMES H. BARRETT, of El Dorado, Saline county, Illinois, have invented a new and Improved Horse-Detacher, of which the following is a full, clear, and exact description.

My invention consists of an improved contrivance whereby the evener may be tripped by the driver and caused by the horses to turn, so that the traces will detach and allow the carriage to be disconnected from the horses when they become uncontrollable, the arrangement by which the same is accomplished being very simple, cheap, and effective, and applicable to two or three horse eveners, also to mowing and harvesting machines, as well as to wagons and carriages, all as hereinafter fully described.

Reference is to be had to the accompanying drawings, forming a part of this specification, in which similar letters of reference indicate corresponding parts in all the figures.

Figure 1 is a perspective view, and Fig. 2 is a side elevation, of my improved detaching apparatus, the evener being in the detaching position in the latter figure.

I pivot the evener $a$ to a flat bar of iron, $b$, that is hinged at $c$, in front of the evener, to another short bar, $d$, that is securely attached to the tongue $q$ in front of the hinge-joint. The bar $b$ extends along the top of the tongue, back of the evener, a suitable distance, and at the rear end it is confined to the tongue by a yoke, $e$, that is so pivoted to the tongue at $f$ that it may swing back off from over the end of said bar, so as to free the latter and allow the draft of the traces on the evener to swing the latter upon hinge $c$ along the quadrant-bar $g$, so that the hooks $h$ of the whiffletrees $i$ will unhook from the traces, thus disconnecting the carriage or machine at any time it may be required to do so for safety.

Instead of the yoke $e$ for holding and disconnecting the bar $b$, a sliding latch-bolt may be employed, and it may be made to trip and release the evener-bar by means of a cord or wire extending back to the driver's place; but for harvesters and other machines I prefer to employ the lever $j$ and latch arrangement $k$ $l$, the lever $j$ being connected to the arm of the yoke by the rod, which may be long or short, according to the distance back of the evener that it may be desired to set the lever $j$.

I prefer to employ auxiliary evener $m$ and connecting-rods $n$, together with the above-described detaching apparatus, for the better control of the evener $a$, by lessening the torsional strain of the evener $a$ on the pivot-bolt $o$. It also prevents the evener $a$ from vibrating vertically and transversely of the tongue to some extent.

The sector-bar $g$ is a guide to control the evener laterally when swinging up along it. Said bar is supported by the upright $p$ at the front of the evener, and back of it said bar passes through a slot of the bar $b$ and is firmly attached to the tongue.

I am aware that it is not new to use a retractile slide in a slotted casting on the thill cross-bar in combination with a single-tree pivoted to said casting, having a catch to engage the slide and provided with slotted tug-clips at its ends; also, that it is not new to use a pull-back lever in connection with the brake while a spring presses a pawl into the notches of a ratchet; also, that it is old in equalizers to employ single-tree levers pivoted to the double-tree and connected by pivoted rods to a middle pivoted cross-bar; but

What I claim as new and of my invention is—

The combination of the evener $a$, the bar $b$, hinged in front thereof to a short bar, $d$, on the tongue, the yoke $e$, pivoted to the tongue at $f$, and the whiffletrees having hooks $h$, all arranged substantially as shown and described.

JAS. H. BARRETT.

Witnesses:
S. T. WEBBER,
J. C. STINSON.